3,131,196
// PURIFICATION OF MERCAPTOBENZOTHIAZOLE
// Paul R. Wood, Naugatuck, Conn., assignor to United
// States Rubber Company, New York, N.Y., a corporation of New Jersey
// No Drawing. Filed Jan. 17, 1962, Ser. No. 166,944
// 4 Claims. (Cl. 260—306)

This invention relates to a method of purifying mercaptobenzothiazole. It is especially concerned with a method of removing impurities of a tarry nature from water or other polar solvent solutions of salts of mercaptobenzothiazoles.

Mercaptoarylenethiazoles, particularly as exemplified by the 2-mercaptobenzothiazole, have been found to be particularly useful as accelerators in the vulcanization of rubber. As a result, many processes have been developed for the commercial preparation of these compounds. Of these, probably the most successful and widely used has been that of U.S. Patent 1,631,871 to Kelly, with modifications thereof. According to that process, mercaptobenzothiazole is produced by reacting aniline with carbon disulfide and sulfur at superatmospheric pressures and elevated temperatures.

The product obtained, however, is contaminated with a number of impurities of a tarry nature. Accordingly, mercaptobenzothiazole, as so produced, ordinarily must be given some type of purification treatment previous to sale and use. Heretofore, this has commonly consisted of treating the crude product with an excess of caustic soda to dissolve the product as its sodium salt. Most of the impurities are also soluble to a significant extent in the aqueous caustic soda solution. Any undissolved material is allowed to settle out and is removed by filtration or other suitable means. On precipitation with acid, the clarified solution yields a final product still containing much of the original impurities. Accordingly, it is usually brown in color, and has a disagreeable odor. It is also possible to use other alkaline substances, such as ammonium hydroxide or other alkali metal hydroxides, in place of caustic soda. The results obtained by the use of other alkaline materials do not differ substantially from the results obtained by the use of caustic soda.

To obtain a higher degree of purification, the crude product of the Kelly process is normally digested with a deliberate deficiency of caustic. Many of the impurities, accordingly, remain undissolved and can be separated leaving a purer product. The purity thereof is not such, however, as to avoid formation of a tarry by-product precipitate containing mercaptobenzothiazole on oxidation of the purified product to benzothiazyl disulfide, which is also an accelerator useful in the vulcanization of rubber. Also, because of a deliberate caustic deficiency, separated solid impurities contain mercaptobenzothiazole. Actually, the content of mercaptobenzothiazole is sufficient to warrant redigestion in caustic for recovery thereof. This, however, increases equipment requirements and cost of production. The recovered mercaptobenzothiazole product, moreover, is of less pure grade than that initially taken.

Another process of removing tarry impurities is described in U.S. Patent 2,730,528. The essential feature of this process is pre-oxidizing the sodium mercaptobenzothiazole water solution. A broad range of types of oxidizing agents is used to oxidize the caustic soluble tarry products to insoluble products which can then be removed. This process of purification has certain disadvantages. The cost of the oxidizing materials is substantial and adds to the cost of the product. Another disadvantage lies in the fact that a portion of the mercaptobenzothiazole salt is oxidized to benzothiazyl disulfide which precipitates with the tarry impurities. In order to fully recover the mercaptobenzothiazole, it therefore becomes necessary to reprocess the precipitated impurities of the oxidizing steps. This reprocessing consists of redissolving the benzothiazyl disulfide in aqueous caustic soda which causes hydrolysis of the benzothiazyl disulfide to mercaptobenzothiazole which in turn forms its sodium salt in the presence of the sodium ion of the caustic soda. This sodium mercaptobenzothiazole is then pre-oxidized and treated in the same manner as the original sodium mercaptobenzothiazole. This additional process step requires additional equipment and increases the cost of production of the purified mercaptobenzothiazole.

It is an object of my invention to provide an improved process for the purification of mercaptobenzothiazole which eliminates the disadvantages and difficulties of the prior art processes mentioned above.

It is a further object of my invention to provide an improved process for the purification of mercaptobenzothiazole in which a soluble aldehyde or a compound which yields a soluble aldehyde in solution is added to a solution of a mercaptobenzothiazole salt to precipitate the tarry impurities present in the solution.

I have found that the addition of water soluble aldehydes, or of compounds that yield water soluble aldehydes in water, to the aqueous sodium or other salt solution of mercaptobenzothiazole transforms the soluble tarry products to insoluble products which can then be easily removed by filtration or other suitable means. Typical of such insolubilizing agents are formaldehyde, paraldehyde, acetaldehyde, paraformaldehyde, furfural, chloral, chloral hydrate, crotonaldehyde, aldol and others. Formaldehyde is preferred, however, since it is low in cost and easily obtainable.

I have found that the amount of tar removed is somewhat dependent on the amount of aldehyde added to the mercaptobenzothiazole in solution. For example, less than about 0.25% of formaldehyde, based on the weight of mercaptobenzothiazole in a water solution of sodium mercaptobenzothiazole, does not precipitate all of the tars present. Between 0.25% and 0.5% of formaldehyde causes the maximum amount of tars to precipitate. No increase in the amount of tars precipitated occurs as the amount of formaldehyde is increased from 0.5% to 3.0%. Above 5% formaldehyde there is actually a decrease in the amount of tars precipitated. The same effect is also exhibited when aldehydes other than formaldehyde are employed.

The amount of tar removed is also influenced by temperature. The removal of tar is at a maximum when the temperature of the mercaptobenzothiazole solution, to which the formaldehyde is added, is between about 0° C. and about 55° C. At temperatures above 60° C., the amount of tar removed from the mercaptobenzothiazole salt solution decreases. In the optimum temperature range, 0° C. to 55° C., the reaction time does not change. All tars precipitate within a minute or two. The time required for the tars to agglomerate to a sufficient particle size to be easily removed by filtration is accelerated by temperature. Therefore, the best working temperature range is from about 25° C. to about 50° C.

The amount of tar removed with aldehydes is also dependent on the pH of the mercaptobenzothiazole salt solution. Mercaptobenzothiazole will precipitate if the pH drops much below 9.0 which, therefore, is the lower pH limit of the system. Maximum tar removal occurs between this lower pH limit and a pH of about 10.8. Above a pH of about 10.9 to 11.0 the amount of tar removed decreases. The preferred pH range is from 9.5 to 10.5.

Alkyl and aryl aldehydes which are not soluble in water, such as benzaldehyde, cinnamaldehyde, n-heptaldehyde and isobutyraldehyde, do not precipitate tarry impurities under these conditions. However, they do precipitate the tars when water, as the solvent for the salt of mercaptothiazole, is replaced with other polar solvents such as methyl alcohol, ethyl alcohol, acetone, methyl ethyl ketone and other alcohols and ketones.

Following the aldehyde purification step, further treatment of the clarified solution to precipitate the purified mercaptobenbothiazole or to oxidize the product to the disulfide can be performed. In the former case, the solution is agitated and acidified with, e.g., hydrochloric or sulfuric acid, the resultant slurry being centrifuged or otherwise treated to separate the purified mercaptobenzothiazole as a wet cake which is then dried. In preparation of disulfide, the clarified solution is treated with an oxidizing agent and the resultant disulfide is de-watered, dried and milled.

The following examples further illustrate the invention but are not intended to be limiting. For simplicity, the following abbreviation will be employed; MBT—mercaptobenzothiazole; NaMBT—sodium salt of mercaptobenzothiazole; MBTS—benzothiazyl disulfide. The effectiveness of my new purification process is indicated in the examples by the color of the product, pure MBT being light in color and the dark brown tarry impurities giving impure MBT a brownish color. Another indication of the effectiveness of my process is the amounts of MBT-free tarry material recovered, the more effective the purification process, the more MBT-free tarry material will be recovered. In the following examples, all percentages are based on weight.

Example 1

A batch of MBT melt, obtained by the reaction of aniline with carbon disulfide and sulfur as described in U.S. Patent 1,631,871, is dissolved in a deficiency of aqueous caustic soda. The aqueous caustic soda is a 50% solution and is added in an amount equal to approximately 15% by weight of the MBT melt. A portion of the tarry products precipitate and are removed by filtration. This NaMBT solution is then diluted to a 10% MBT content, at which time more tarry products separate. The tarry solids are separated by filtration. The filtrate has a pH of 10.5 and is dark reddish-brown. This is the starting material for further examples.

Example 2

300 grams of the NaMBT solution of Example 1 are heated to 45° C. An excess of dilute sulfuric acid is added. The slurry of precipitated MBT is filtered, the collected solids being washed and dried. The product yield is 28.3 grams. The color of the product is tan. This example shows the total weight of MBT precipitated from the NaMBT solution. This product includes MBT plus the tarry impurities that must be removed from the MBT prior to sale and use.

Example 3

Following the method of Examples 3 and 4 of U.S. Patent 2,730,528, 300 grams of the NaMBT solution of my Example 1 are heated to 45° C. and a 2.0% solution of $(NH_4)_2S_2O_8$ is added to the point of maximum slope on the pH curve. The resultant mix was filtered after all precipitated tarry products had agglomerated. The filtrate, light straw yellow in color, was acidified and the MBT product was separated by filtration, washed and dried. The yield of MBT was 27.1 grams. The color was creamy white. 1.6 grams of dark brown, MBT-free, tar with a softening point of about 40° C. were obtained.

Example 4

Another procedure which has been used commercially is to purify the NaMBT solution by blowing air through it for three hours at a temperature of 45° C. To illustrate the results thus obtained, 300 grams of the NaMBT solution of Example 1 were heated to 45° C. for three hours while air was blown through it. Tarry products were filtered out. The resulting filtrate, not as light a straw yellow color as in Example 3, was acidified. The precipitated MBT was separated by filtration, washed and dried. It was more tan in color than in Example 3 and weighed 28 grams. 0.6 gram of tar similar to that obtained in Example 3 was obtained.

Example 5

300 grams of the NaMBT solution of Example 1 was heated to 45° C., and 0.5% of formaldehyde (as a 37% water solution), based on MBT content, was added. Within one minute, the solution became very turbid with a colloidal precipitation of tarry products. On standing for 16 hours, the colloidal precipitate had completely agglomerated and the resultant tarry masses were easily filtered out. The filtered solution was clear and had a straw yellow color. The filtrate was acidified and the MBT product was separated by filtration, washed and dried. The yield of MBT was 27 grams. The color was a creamy white. 1.7 grams of dark brown MBT-free tar with a softening point of about 40° C. were obtained.

I have also found that I can greatly decrease the time required to agglomerate the colloidal precipitate of tarry products to a size which can be readily separated by filtration by either stirring the batch rapidly, by dispersing air in the batch, or by blowing air through the batch. By either method, satisfactory agglomeration occurs in 1 to 3 hours.

Example 6

Example 5 was repeated except that, 15 minutes after the addition of formaldehyde, air was blown through the batch while it was maintained at 45° C. In 1 hour, agglomeration of tarry products was sufficient so that they could be easily filtered out. Yield was similar to that of Example 5.

Example 7

The effect of the addition of an aldehyde to NaMBT solution was further illustrated by the following example. MBTS has been made commercially by the oxidation of an air blown NaMBT solution. The air blown method of Example 4 removes a certain amount of tar, such that the final MBTS products obtained by oxidation of the Example 4 product, consistently assays about 92% MBTS. 6 runs were made in exactly the same way, except that 0.5% formaldehyde, based on MBT content, was added to the 10% NaMBT solution. After 15 minutes of stirring, the batches were air blown for 2 hours and 15 minutes to hasten agglomeration of the precipitated tars. After a normal filtration operation, the NaMBT solutions were converted to MBTS. The assay was consistently 95% MBTS or better.

A comparison of the above examples indicates the effectiveness of my improved process. The amount of MBT-free tarry impurities removed from the NaMBT solution by my process is greater than the amounts of such impurities removed by prior art processes. This factor plus the fact that the use of my process requires minimum expense for additional equipment and additive materials results in considerable savings in the cost of purified mercaptobenzothiazole.

Having thus described my invention, what I claim and desire to protect by Letters Patent is:

1. A process for the purification of mercaptobenzothiazole which comprises dissolving said mercaptobenzothiazole in an aqueous alkaline solution, maintaining the resultant solution at a temperature from about 0° C. to about 55° C. and at a pH from about 9 to about 10.8, adding formaldehyde to said solution in an amount from about 0.25% to about 5% based on the weight of mercaptobenzothiazole in said solution, and separating the impurities precipitated by the addition of the formaldehyde from the mercaptobenzothiazole solution.

2. The process as defined in claim 1 in which the alkaline solution is a solution of caustic soda.

3. The process as defined in claim 2 in which air is blown through the mercaptobenzothiazole solution following the addition of formaldehyde.

4. A process for the purification of mercaptobenzothiazole which comprises dissolving said mercaptobenzothiazole in aqueous caustic soda, maintaining the resultant solution at a temperature from about 25° C. to about 50° C., and at pH of about 9.5 to about 10.5, adding formaldehyde to said solution in an amount of from 0.25% to about 0.5%, based on the weight of mercaptobenzothiazole in said solution, to precipitate the impurities in said solution, and separating the precipitated impurities from said solution.

No references cited.